United States Patent
Dodge et al.

(10) Patent No.: US 10,853,032 B1
(45) Date of Patent: Dec. 1, 2020

(54) CURATING AUDIO AND IR COMMANDS THROUGH MACHINE LEARNING

(71) Applicant: Amazon Technologies, Inc., Seattle, WA (US)

(72) Inventors: Michael L S Dodge, Seattle, WA (US); Charles Shearer Dorner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 16/289,604

(22) Filed: Feb. 28, 2019

Related U.S. Application Data

(63) Continuation of application No. 15/368,496, filed on Dec. 2, 2016, now Pat. No. 10,268,447.

(51) Int. Cl.
  *G06F 3/16* (2006.01)
  *H04L 12/28* (2006.01)

(52) U.S. Cl.
  CPC ............ *G06F 3/167* (2013.01); *H04L 12/282* (2013.01)

(58) Field of Classification Search
  CPC ...................................................... G06F 3/167
  See application file for complete search history.

(56) References Cited

U.S. PATENT DOCUMENTS

| | | | |
|---|---|---|---|
| 5,158,181 A | 10/1992 | Bailey | |
| 6,219,645 B1 | 4/2001 | Byers | |
| 7,969,514 B2 | 6/2011 | Haughawout et al. | |
| 7,973,648 B2 | 7/2011 | Kawakita | |
| 8,098,337 B2 | 1/2012 | Martch | |
| 8,502,925 B2 | 8/2013 | McRae et al. | |
| 9,754,480 B2 | 9/2017 | Arling | |
| 2001/0041982 A1 | 11/2001 | Kawasaki et al. | |
| 2003/0189509 A1 | 10/2003 | Hayes et al. | |
| 2010/0278377 A1 | 11/2010 | Hamel et al. | |
| 2010/0329688 A1 | 12/2010 | Young | |
| 2011/0283338 A1 | 11/2011 | Yang et al. | |
| 2012/0051589 A1 | 3/2012 | Schloegel et al. | |
| 2014/0079223 A1 | 3/2014 | Nguyen et al. | |
| 2014/0222436 A1 | 8/2014 | Binder et al. | |
| 2016/0316293 A1 | 10/2016 | Klimanis | |
| 2017/0017928 A1 | 1/2017 | Miller et al. | |

(Continued)

OTHER PUBLICATIONS

U.S. Appl. No. 15/368,496 , "Corrected Notice of Allowance", dated Mar. 22, 2019, 3 pages.

(Continued)

*Primary Examiner* — Yu-Hsi D Sun
(74) *Attorney, Agent, or Firm* — Kilpatrick Townsend & Stockton LLP

(57) ABSTRACT

Techniques for curating audio and IR commands using machine learning may be provided. For example, the system can receive an audio stream that includes a plurality of audio segments provided by a particular user (e.g., as determined through acoustic fingerprinting) and the system can store the audio stream and/or segments in the user's profile. The system can also store a command associated with the audio segment(s). When a portion of the audio is provided in conjunction with a same command over a threshold number of repetitions, the next time that that audio segment is received, the system may provide the command that corresponds with that audio segment to an output device to cause an operation of the output device.

20 Claims, 8 Drawing Sheets

(56) References Cited

U.S. PATENT DOCUMENTS

2017/0041524 A1    2/2017  Schoenen et al.

OTHER PUBLICATIONS

U.S. Appl. No. 15/368,438 , "U.S. Patent Application", filed Dec. 2, 2016, titled: Learning Multi-Device Controller With Personalized Voice Control.
U.S. Appl. No. 15/368,482 , "U.S. Patent Application", filed Dec. 2, 2016, titled: Personalizing the Learning Home Multi-Device Controller.
U.S. Appl. No. 15/368,496 , "Notice of Allowance", dated Dec. 10, 2018, 7 pages.
U.S. Appl. No. 15/368,496 , "U.S. Patent Application", filed Dec. 2, 2016, titled: Curating Audio and IR Commands Through Machine Learning.
Kellogg et al., "Bringing Gesture Recognition to All Devices", Proceeding NSDI'14: Proceedings of the 11th USENIX Conference on Networked Systems Design and Implementation, Apr. 2-4, 2014, pp. 303-316.

CURATING AUDIO AND IR COMMANDS THROUGH MACHINE LEARNING

CROSS-REFERENCE TO RELATED APPLICATIONS

This application is a continuation of U.S. patent application Ser. No. 15/368,496 filed on Dec. 2, 2016, now U.S. Pat. No. 10,268,447 issued on Apr. 23, 2019, entitled "Curating Audio and IR Commands Through Machine Learning," which is related to U.S. patent application Ser. No. 15/368,438, filed on Dec. 2, 2016, entitled "Learning Multi-Device Controller With Personalized Voice Control" and U.S. patent application Ser. No. 15/368,482, filed on Dec. 2, 2016, entitled "Personalizing the Learning Home Multi-Device Controller," the full disclosures of which are incorporated herein by reference for all purposes.

BACKGROUND

Operation of home devices is restricted to commands generated by device manufacturers. For example, there may be several electronic devices in a living room, including a television, cable box, and audio amplifier for audio, and each one would have a remote with pre-defined buttons on the remote. Operations of these devices would benefit from flexibility and user preferences, but these remotes are set in plastic.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for curating audio and IR commands through machine learning. For example, the system can receive an audio stream that includes a plurality of audio segments and the system can store the audio stream and/or segments in a first data store. The system can also store a command in a second data store (e.g., received from an IR transmitting device, received from a pushed button at a device that is connected to a network of devices, etc.). When a portion of the audio stream (e.g., a particular audio segment, etc.) is provided in conjunction with a same command around the same time and exceeds a threshold number of repetitions, the next time that that audio segment is received, the system may provide a command that corresponds with that audio segment to an output device to cause an operation of the output device. In some examples, the system may confirm that the audio segment corresponds with the command before providing the command. This disclosure may use, for example, signal detection, acoustic fingerprinting, and/or shared vocabulary lists.

In an illustrative example, a family promotes one person to operate a remote control for a television in a living room. The family may have created a pattern of providing audio commands to each other, so that whenever anyone else in the family wants the remote barer to fast forward a show, they say "zip zip." This command can signify to the remote barer that they should operate the remote to fast forward the show. As such, when this system is implemented, a microphone attached to a speaker in the home can also receive the audio command "zip zip" and may be operable with a home network. The microphone can identify other devices in the home, including the television that received a fast forward command via an infrared (IR) transmission after the "zip zip" audio was received at the microphone. These and other patterns and correlations may be stored over time. After receiving a particular number of repeated audio and fast forward commands, when the system hears "zip zip" again, the system can ask "do you want to fast forward the television in the living room?" In some examples, the system may not confirm the correlation and simply provide the fast forward command to the television without asking.

Figure 1:
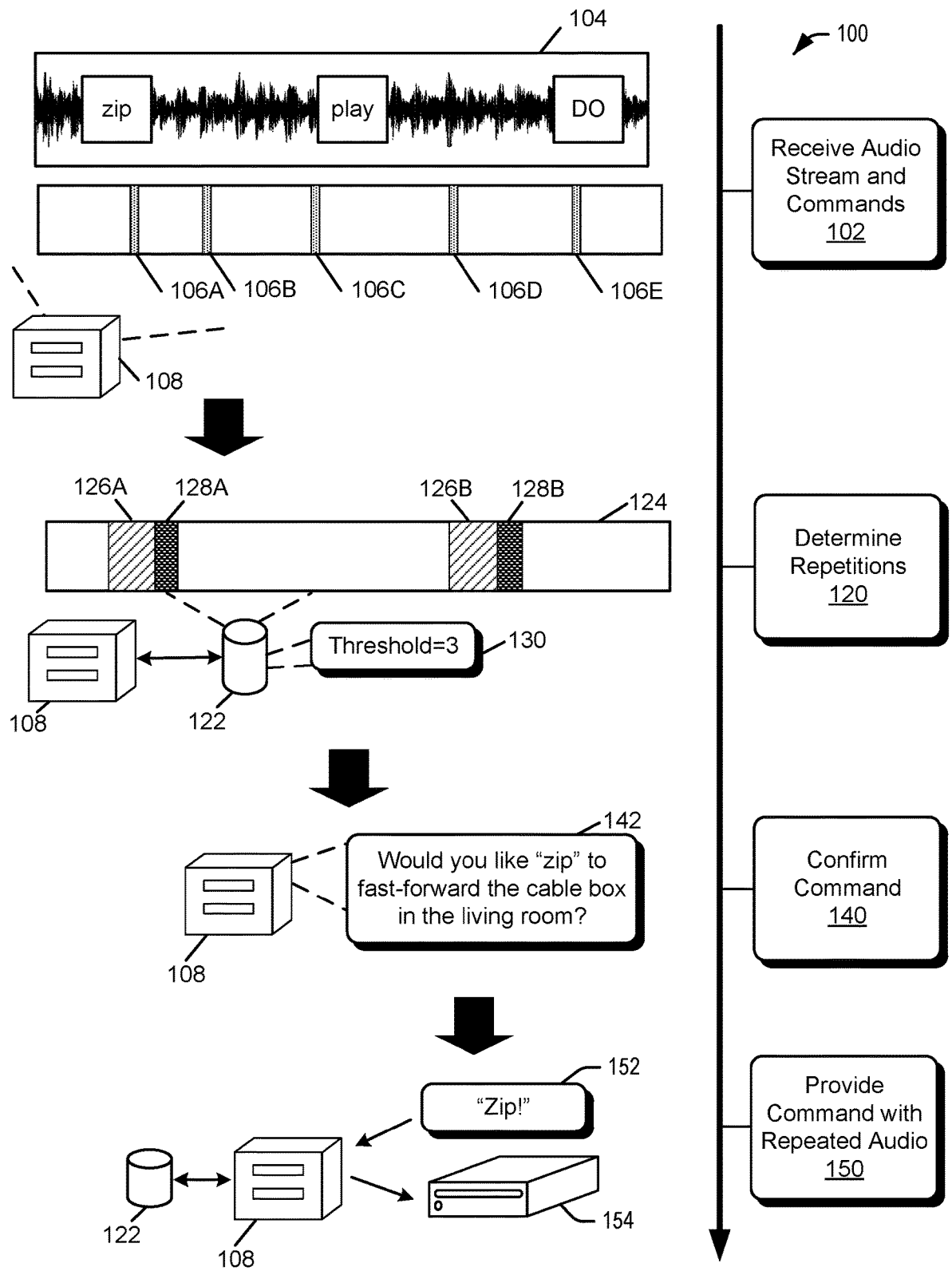
FIG. 1 illustrates an illustrative flow for curating audio and IR commands through machine learning as described herein, according to at least one example.

FIG. 1 illustrates an illustrative flow for curating audio and IR commands through machine learning as described herein, according to at least one example. The process 100 can begin with receiving an audio stream and commands at 102. For example, a computer system 108 can receive an audio stream 104 that comprises one or more audio commands and may also receive one or more commands 106.

The computer system 108 may receive the audio stream 104 via a microphone (e.g., communicatively coupled with the computer system 108, installed with the computer system 108, etc.). For example, the audio stream 104 may comprise a foreground audio signal and background audio signal captured by the microphone. The foreground audio signal can include a verbal command (e.g., "turn on the game") and a background audio signal of an area around the source of the verbal command. For example, a user may speak "turn on the game" while a song plays in the background. The source of the song may be another device on the network, which can be used to help determine a location of the origin of the command (e.g., the background audio includes a song, so the microphone should be next to the speaker that is providing the song, etc.). The audio of the song may be included with the audio stream 104.

The computer system 108 may receive one or more commands 106 (e.g., illustrated as command 106A, command 106B, command 106C, command 106D, and command 106E) via an IR receiver (e.g., communicatively coupled with the computer system 108, installed with the computer system 108, etc.). For example, the command 106 may comprise an infrared (IR) command transmitted from a controller by an IR transmitter. The command 106 may be received by a device (e.g., television, amplifier, etc.) and also received by the computer system 108 (e.g., via IR, via an electronic communication on a network from a device that communicates with computer system 108, etc.).

The one or more commands 106 may comprise a non-IR signal, including a button pressed at the device or other interaction with a user interface provided by the device. When the device is accessible on a network with the computer system 108, the received command may be identified by the computer system 108 when it is received by the device. In some examples, the command may be translated to an electronic message and transmitted via the network, where the computer system 108 can identify the received one or more commands 106 (e.g., when the computer system 108 is a common connection device or a hub, etc.).

The process 100 can determine one or more repetitions at 120. For example, the computer system 108 can receive and analyze the audio stream 104. The computer system 108 can store a portion of the audio stream 104 as audio stream 124 that comprises audio segments 126 in data store 122. The audio stream 124 may comprise one or more audio segments 126 that correspond with one or more commands 128. For example, an audio segment 126A may include "zip" and a command 128A may include instructing a television to fast-forward through media being provided by the television. In some examples, the audio stream 104 may not be stored (e.g., due to space limitations, etc.).

The audio segments 126 may be stored as a portion of audio (e.g., five-ten seconds before the command 128, etc.). The particular pairing of some specific audio segments 126 and some specific command 128 may occur a threshold number of times before the audio segment is flagged as a candidate audio segment that may correspond with an IR command.

In some examples, the candidate audio segments may be stored with the data store 122 as potential audio segments and flagged. As a sample illustration, an audio segment may include the term "zip" that is provided within five seconds of receiving a fast-forward command. The data store 122 may identify the potential pairing of the audio segment and command as being repeated twice. When the threshold is three, the computer system 108 may take no additional action, and continue to store this pairing in the data store 122 without proceeding to the next step (e.g., to confirm the command, etc.). In some examples, the audio segment may be flagged as a candidate audio segment that may be associated with a command (e.g., after more time and/or repetitions of the audio signal and command). In some examples, once the term "zip" is provided within five seconds (e.g., or some other reduced time frame, etc.) of receiving a fast-forward command, the pairing may be flagged to confirm.

The data store 122 can comprise one or more thresholds 130. The threshold may help determine when to ask a user if the audio command corresponds with a particular IR command. The threshold may comprise, for example, two to five times and/or vary by command type. In some examples, the one or more thresholds 130 may vary by profile, device, or command. Other types of information may be stored with the data store 122 without diverting from the scope of the disclosure.

The data store 122 can also store one or more audio streams 104. For example, the one or more audio streams 104 can comprise audio captured by one or more microphones in a network. The one or more audio streams 104 may be a constant audio stream (e.g., always recording and/or streaming by the microphone, etc.) or an audio stream that is active after receiving one or more sounds (e.g., activated by a key word, etc.).

The data store 122 can also store one or more potential candidates of one or more audio streams 104. For example, the potential candidates can include an audio segments 126 that may correspond with a command 128, but may not have been repeated a threshold number of times. These entries may be flagged or, in some examples, the computer system 108 may take no action and want to receive the pairing of the audio segment and the command a threshold number of times.

The process 100 can confirm a command at 140. For example, once an audio segment has been identified (e.g., flagged in data store 122, etc.) in correlation with an IR signal, the computer system 108 may provide a confirmation 142 of the command. By exceeding the threshold, the computer system 108 may ensure a high likelihood of receiving an affirmative response to the proposed confirmation.

The confirmation 142 can confirm that the user would like to associate the audio segment with the command. The computer system 108 can replay the audio segment and the command as confirmation. For example, the confirmation may follow the format: "would you like to associate <sound> with <command> for <device>?" As a sample illustration, the computer system 108 may provide (e.g., using a speaker associated with the computer system 108 and/or on the network, etc.): "would you like 'zip' to fast-forward the cable box in the living room?"

The user may respond to the confirmation 142. For example, the user may respond with an audible "yes" or "no." The computer system 108 can receive the response by the microphone. Alternatively, the computer system 108 can query the user through a user interface (e.g., as illustrated with FIG. 6) and the user can respond by interacting with the user interface.

The process 100 can provide a command that corresponds with the repeated audio at 150. For example, when the computer system 108 receives the recognized audio segment 152 (e.g., "zip"), the computer system 108 can transmit the command to a device 154. The command may be transmitted as an IR signal, using other wireless communications methods, or as an electronic communication through a wired, cabled network.

Figure 2:
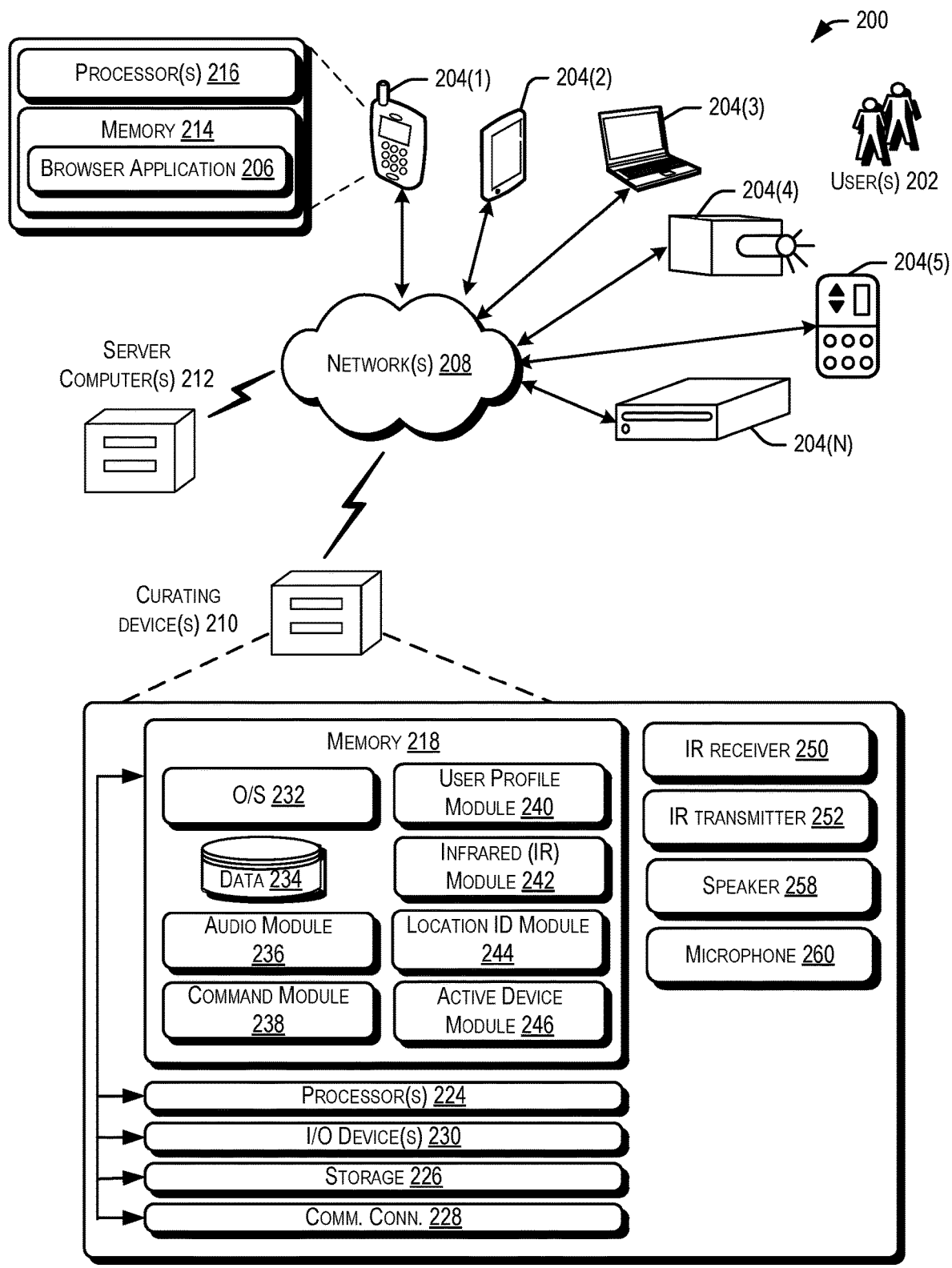
FIG. 2 illustrates an example architecture for curating audio and IR commands through machine learning described herein that includes a computer and/or a user device connected via one or more networks, according to at least one example.

FIG. 2 illustrates an example architecture for curating audio and IR commands through machine learning described herein that includes a computer and/or a user device connected via one or more networks, according to at least one example. In architecture 200, one or more users 202 (i.e., web browser users) may utilize user computing devices 204(1)-(N) (collectively, user devices 204) to interact with media or other content (e.g., by providing audio and machine learning when those audio segments correspond with commands for devices in the one or more networks 208, etc.).

The one or more user devices 204 may comprise a variety of devices. The one or more user devices 204 may comprise a user device 204(1), smart phone 204(2), personal computer 204(3), audio/visual (AV) equipment 204(4), remote controller 204(5), cable box, media player (e.g., Blu-ray player, compact disc (CD) player, etc.), microphones, speakers, and the like. These one or more user devices 204 may communicate with one or more curating devices 210 through wired or wireless communications, including via infrared radiation (IR) signals. In some examples, the user device 204 may receive communications via audio (e.g., from a user or device, captured by a microphone, etc.). The one or more curating devices 210 may comprise an IR receiver 250 and/or IR transmitter 252, as well as an antennae or other hardware to communicate via the wired or wireless communication. In some examples, the one or more curating devices 210 may provide audio through one or more speakers 258 and receive audio from a microphone 260. The one or more curating devices 210 may receive and provide audio, in some examples, by interacting with other devices on the network that include speakers or microphones, especially if the one or more curating devices 210 does not include speaker 258 or microphone 260.

In some aspects, the one or more users 202 (i.e., web browser users) may utilize user computing devices 204(1)-(N) to access an application 206 (e.g., a web browser), via one or more networks 208. The application 206 may be hosted, managed, and/or provided by a computing resources service or service provider, such as by utilizing one or more service provider computers and/or one or more curating devices 210. In some examples, the one or more curating devices 210 may implement functionality interchangeably with one or more server computers 212 (e.g., remote to the one or more curating devices 210, on a cloud network, etc.).

The one or more server computers 212 (or one or more curating devices 210, etc.) may, in some examples, provide computing resources such as, but not limited to, client entities, low latency data storage, durable data storage, data access, management, virtualization, cloud-based software solutions, electronic content performance management, etc. The one or more server computers 212 may also be operable to provide web hosting, computer application development, and/or implementation platforms, combinations of the foregoing, or the like to the one or more users 202. The one or more server computers 212, in some examples, may help curate audio and IR commands through machine learning in networks 208 and/or communicate with one or more curating devices 210 to receive and provide data (e.g., for analysis, etc.).

In some examples, the networks 208 may include any one or a combination of many different types of networks, such as a home network with interconnected devices, cable networks, the Internet, wireless networks, cellular networks and other private and/or public networks. While the illustrated example represents the users 202 accessing the application 206 over the networks 208, the described techniques may equally apply in instances where the users 202 interact with the one or more server computers 212 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more server computers 212, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the curating devices 210 or one or more server computers 212 via the networks 208, or via other network connections. Additionally, the user devices 204 may be part of the distributed system managed by, controlled by, or otherwise part of the one or more server computers 212 (e.g., a console device integrated with the curating devices 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the curating devices 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the one or more curating devices 210 and/or one or more server computers 212 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some examples, the one or more curating devices 210 and/or one or more server computers 212 may be in communication with the user devices 204 and/or other service providers via the networks 208, or via other network connections. The more server computers 212, for example, may include one or more servers, perhaps arranged in a cluster, as a server farm, or as individual servers not associated with one another. These servers may be configured to implement the content performance management described herein as part of an integrated, distributed computing environment.

In one illustrative configuration, the curating devices 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of curating devices 210, the memory 218 may be volatile (such as RAM) and/or non-volatile (such as ROM, flash memory, etc.). The curating devices 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the curating devices 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the curating devices 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The curating devices 210 may also contain communications connection(s) 228 that allow the curating devices 210 to communicate with a stored database, another computing device or server, user terminals and/or other devices on the networks 208. The curating devices 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including an audio module 236, a command module 238, a user profile module 240, an infrared radiation (IR) module 242, a location identifier module 244, and/or an active device module 246. The modules may be software modules, hardware modules, or a combination thereof. If the modules are software modules, the modules will be embodied on a computer readable medium and processed by a processor in any of computer systems described herein.

The audio module 236 may be configured to receive audio from one or more microphones or other devices. For example, the audio module 236 may receive streaming audio or a stored audio file corresponding with audio from a microphone or other user device 204 in the network. In some examples, the audio module 236 may be configured to identify a source of the audio (e.g., with the location identifier module 244).

The command module 238 may be configured to interact with the audio module 236 to translate audio into a command. For example, the command module 238 may correlate the audio with an audio segment, key word, and/or IR signal, such that when the audio is received, the command may be identified that corresponds with the received audio.

The user profile module 240 may be configured to generate and maintain one or more user profiles. For example, the user profile module 240 may correlate a received audio segment with a particular user, including an acoustic fingerprint of the audio signal that uniquely identifies the user's voice. The user profile module 240 may correlate the audio with a priority (e.g., a command from user A is higher priority than a command from user B, etc.).

The infrared radiation (IR) module 242 may be configured to receive an IR signal. For example, using the IR receiver 250, the IR module 242 may receive and/or store the IR signal. The IR module 242 may be configured to analyze the IR signal to determine frequency, wavelength or other signal information associated with the IR signal (e.g., to determine an originating device, to determine a proximate location with the location ID module 244, etc.). In some examples, the IR module 242 may be configured to send the IR signal (e.g., using the IR transmitter 252) after IR signals are identified to correspond with the received commands.

The infrared radiation (IR) module 242 may also be configured to determine a command and/or translate the IR signal into a command. For example, the IR module 242 may detect an IR signal and, through communications with other devices on the network, determine that a particular device changed a state of the device (e.g., powered on in response to an IR signal associated with instructing the television to power on, etc.). The IR module 242 may determine that the detected signal is associated with that particular command and that particular device based in part on the historical data received.

In some examples, the IR module 242 may also be configured to broadcast IR signals (e.g., using the IR transmitter 252). This functionality, like the other modules, may also or alternatively be implemented with a controller associated with the one or more curating devices 210 and/or one or more server computers 212, or transmitted via a wired communication network (e.g., high-definition video devices (HDMI), universal serial bus (USB), etc.).

The location identification (ID) module 244 may be configured to receive a high frequency signal and/or determine a location based at least in part on a high frequency signal. For example, devices (e.g., televisions, amplifiers, etc.) in the network may emit a high frequency sound that is inaudible to the user, but received by the microphones in the network. The microphones may transmit the high frequency signals to the audio module 236 to analyze. The high frequency signals may vary by being louder closer to a location of a microphone, or each device may emit different signals to help determine which high frequency sound is being received by the particular device.

The location identification (ID) module 244 may also be configured to determine a location of a device using a global positioning system (GPS) or other positioning system data associated with the device. For example, the location ID module 244 may comprise a geo-location device (e.g., a global positioning system (GPS) device or the like) for providing and/or recording geographic location information associated with the one or more curating devices 210 and/or other devices in the network. The positioning data of a user device may help identify proximate devices to the user device by comparing the locations of each device and choosing the closest device to the user device based at least in part on each device's location.

The location identification (ID) module 244 may also be configured to determine location using gesture detection, implementing a microphone array, determining a direction of received audio, location detection by identifying a device that emits a signal, or other methods of determining location described herein.

The active devices module 246 may be configured to determine one or more active devices on a network. For example, the active devices module 246 may identify active devices by pinging the device, communicating with the device, and the like. The devices that respond to these communications may be active. In some examples, the active devices may be limited to devices within particular local area network (LAN) or other limited geography (e.g., identified by IP addresses, etc.).

The one or more curating devices 210 may also comprise an IR receiver 250. The IR receiver 250 may consist of hardware that may receive and decode IR signals that are broadcast by other devices. Similarly, the one or more curating devices 210 may also comprise an IR transmitter 252 or IR emitter. The IR transmitter 252 may produce light energy in the infrared spectrum in order to transmit infrared signals from the connection device 210. The IR transmitter 252 may comprise one or more light emitting diodes (LED) to produce the IR signal.

The one or more curating devices 210 may also comprise one or more HDMI ports 254 or USB ports 256 to transfer data using HDMI or USB compliant devices. For example, the HDMI ports 254 may receive and transmit compressed or uncompressed video and audio data from an HDMI-compliant source device. The USB ports 256 may receive and transfer, at a short-distance, digital data communications.

Figure 3:
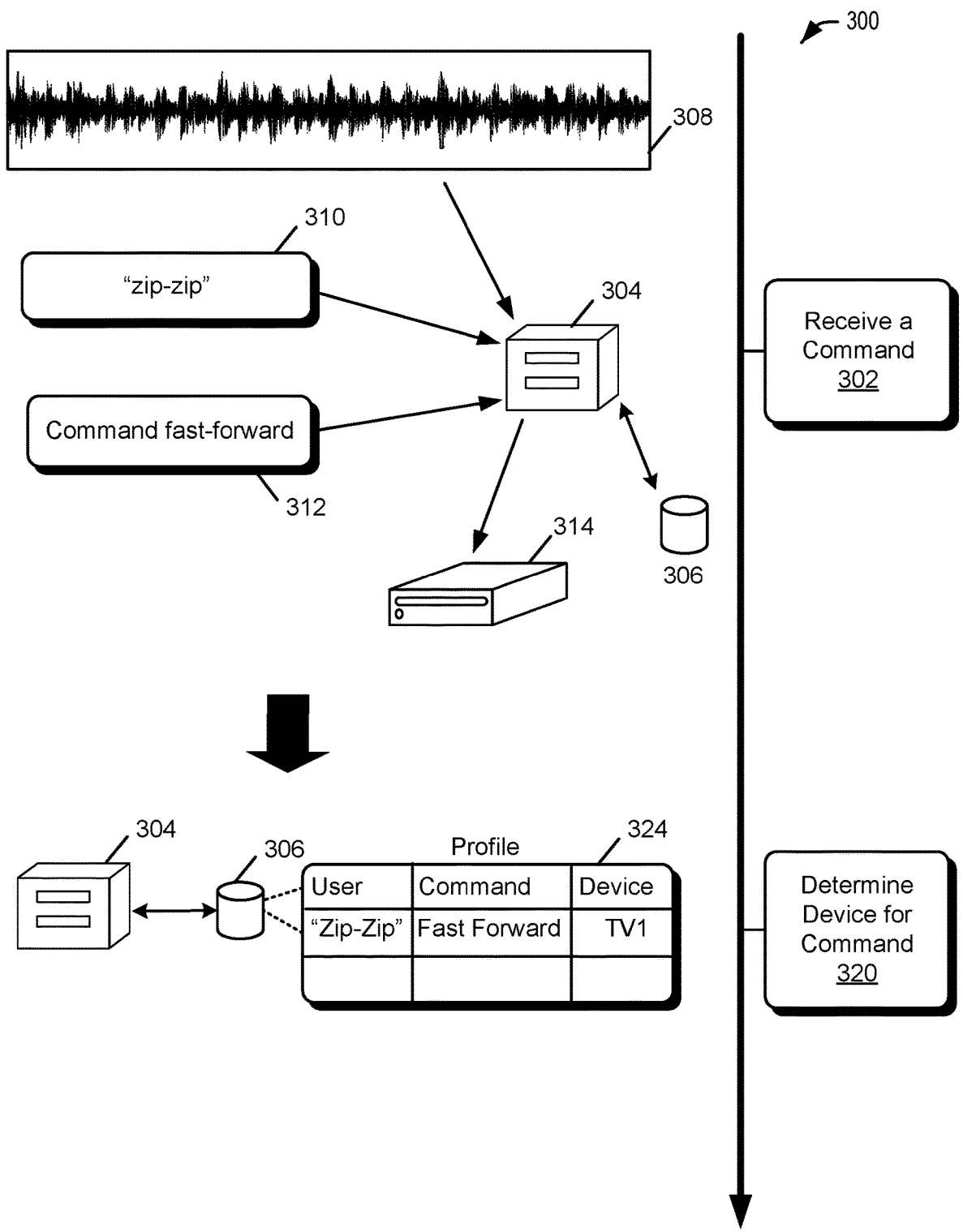
FIG. 3 illustrates an example flow diagram for curating audio and IR commands through machine learning described herein, according to at least one example.

FIG. 3 illustrates an example flow diagram for curating audio and IR commands through machine learning described herein, according to at least one example. The computer system 304 and data store 306 may be similar to one or more curating devices 210 and data store 234, respectively, illustrated in FIG. 2.

The process 300 may begin with receiving a command at 302. For example, the computer system 304 may receive an audio signal 308, audio segment 310, and/or a command 312 (e.g., which may be stored in data store 306, etc.). The audio signal 308 may comprise a foreground audio signal and background audio signal captured by a microphone. The audio segment 310 may be a portion of the audio signal 308 that may be as exceeding a threshold, as discussed with FIG. 1. The command 312 may correspond with an IR signal to operate the device 314.

The audio segment 310 may be identified from the audio signal 308 when a key word is provided. For example, a user may say "begin" and then the audio segment "zip." The key word "begin" may initiate a recording of the audio segment 310 to be stored at data store 306. In some examples, the key word may include a pre-defined phrase identified by the user or system administrator associated with computer system 304 to identify the initiation of the audio segment 310 to be identified from the audio signal 308.

The audio segment 310 may be identified when accompanied with a command 312. As discussed with FIG. 1, candidate audio segments may be stored with the data store 306 as potential audio segments and flagged after a threshold number of times. As a sample illustration, an audio segment may include the term "zip" that is provided within five seconds of receiving a fast-forward command. The data store 306 may identify the potential pairing of the audio segment and command as being repeated twice. When the threshold is three, the computer system may take no additional action, and continue to store this pairing in the data store 306 without proceeding to the next step (e.g., to confirm the command, etc.). Once the term "zip" is provided within five seconds of receiving a fast-forward command, the pairing may be flagged to confirm. Once confirmed, the term "zip" may be identified as an audio segment 310 with a corresponding command 312.

The audio segment 310 may comprise repeated sounds. For example, the audio segment 310 may not correspond with a word in English, but rather a word in a different language and/or a particular sound. In some examples, the audio segment 310 may include a bell ringing (e.g., that corresponds with a request to turn on a television, etc.).

The audio segment 310 may correspond with an acoustic fingerprint or a digital summary of the audio segment 310. The acoustic fingerprint may define an audio segment 310 for a zero crossing rate, tempo, average spectrum, spectral flatness, prominent tones across a set of frequency bands, and/or bandwidth.

The acoustic fingerprints of more than one audio segment 310 may be compared to determine similarities between the plurality of audio segments 310. In some examples, the acoustic fingerprints of two or more audio segments 310 may be compared to determine if the audio segment 310 originate from the same user (e.g., by comparing the tempo of each audio segment 310, by comparing the prominent tones, etc.). Values associated with the compared audio segments within a certain threshold of each other may be determined to be related.

A user profile may comprise an acoustic fingerprint of the user. In some examples, the audio segment 310 may be analyzed by the computer system 304 to determine an acoustic fingerprint of the audio segment 310. The acoustic fingerprint of the audio segment 310 may be compared with the acoustic fingerprint of the user. This may help determine if an audio segment 310 originated with the user. The computer system 304 may confirm the origin of the audio segment 310 when the acoustic fingerprint of the audio segment 310 is within a threshold value of the user's acoustic fingerprint. In some examples, the acoustic fingerprint may be a sound average of multiple audio segments of the user.

The audio segment 310 may correspond with temporal patterns or usage patterns. For example, the audio segment 310 may be received at particular times or for common uses associated with temporal patterns or usage patterns. For example, a television device in a living room may be used to watch a football game every Saturday, a television device in a guest room may be used to watch a football game every Monday, and a radio may be used to listen to the football game every Thursday. This pattern of interactions with the devices may be stored with the data store 306 and/or a user profile.

The location of the devices may be determined by temporal patterns or usage patterns as well. For example, the location of the devices may not be determined and instead, the device identified for the command may be identified based on these patterns (e.g., identified in a user profile, identified by the audio segment 310, etc.). The temporal patterns or usage patterns may be based on historical interactions with one or more particular devices (e.g., watch a football game every Saturday, etc.).

The audio segment 310 may be stored as a binary representation of the audio in the audio segment. When compared with other audio, the binary representation of audio segment 310 may be compared with the binary representation of the second audio. The binary values may be compared to calculate any differences. The audio sources may be related when the binary representation for the audio segments are within a threshold value.

The computer system 304 may receive command 312 provided to a device 314, when the command 312 is broadcast. For example, a controller associated with the device 314 may broadcast the command 312 using an IR transmitter, which may be received by the IR receiver at the computer system 304. The computer system 304 can identify the command and/or device associated with the command.

In some examples, the computer system 304 may compare frequencies of the command 312 with stored frequencies of devices at the data store 306 using an autocorrelation algorithm. For example, the computer system 304 may receive the command 312, identify the frequency of the IR signal used to transmit the command 312, determine a stored signal and/or frequency of a known device, and compare the stored frequency with the received frequency. When the stored frequency is within a threshold determination of the received frequency, the computer system 304 can determine the origin of the received frequency as the origin identified with the stored frequency. When the stored frequency is outside of the threshold determination of the received frequency, the computer system 304 can review other stored frequencies for a signal that may match the received frequency within the threshold.

The process 300 may determine a device associated with the command at 320. For example, the computer system 304 can identify a device 314 that may correspond with the received audio segment 310 and/or command 312. In some examples, the audio segment 310 and/or command 312 may correspond with a particular device stored in the data store 306 of a user profile 324.

In some examples, the audio segment 310 and/or command 312 may be device agnostic and the computer system 304 can determine a device that corresponds with the audio segment 310 and/or command 312 at a particular time. The device may be chosen from a list of active devices. Additional examples of determining a device are provided with FIG. 4.

Figure 4:
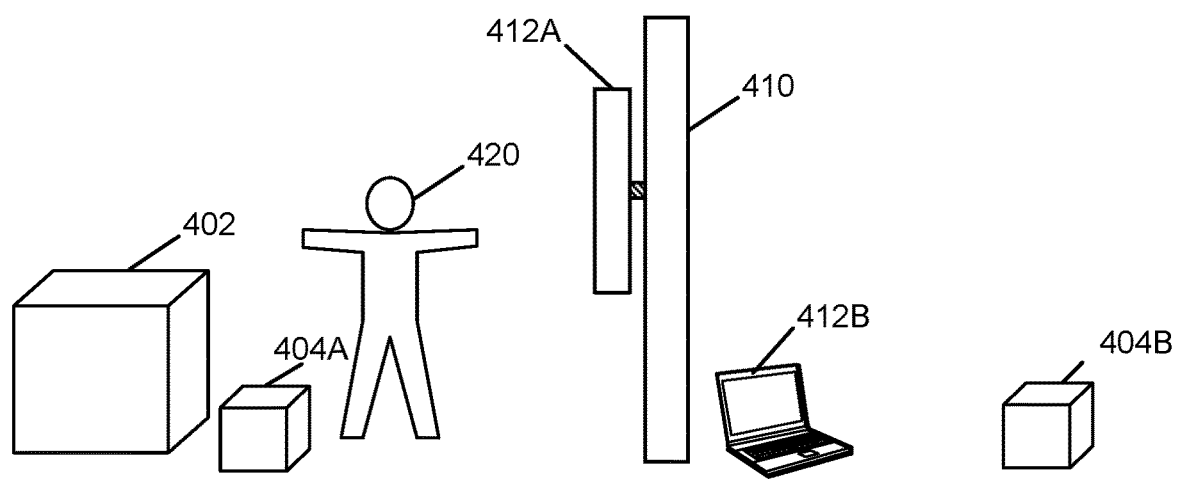
FIG. 4 illustrates an example environment of curating audio and IR commands through machine learning described herein, according to at least one example.

FIG. 4 illustrates an example environment of curating audio and IR commands through machine learning described herein, according to at least one example. The command may be device agnostic. For example, the audio segment may correspond with similar commands that may be used to operate multiple devices. This may include, for example, a television, videocassette recorder (VCR), or cable box that all correspond with a rewind command from each device's corresponding remote controller.

As illustrated in FIG. 1, the computer system 402 (e.g., similar to the one or more curating devices 210 and/or one or more server computers 212 in FIG. 2) may exist in a home with one or more microphones 404 (illustrated as microphone 404A and 404B). A wall 410 may separate the one or more devices 412 (illustrated as device 412A and 412B).

The user 420 may provide an audio segment (e.g., "zip") within an audio stream (e.g., a conversation with a family member about a show, etc.). The computer system 402 may identify the user by its acoustic fingerprint, in some examples, and associate the previously correlated command of fast forward to the audio segment. The computer system 402 may then identify an output device to send the identified command.

The output device may correspond with device 412A or device 412B (or other devices on the network, etc.). The computer system 402 may identify a foreground audio signal and background audio signal to determine which device is closest to the user. For example, the audio stream may comprise a foreground audio signal that includes a verbal command (e.g., "turn on the game") and a background audio signal of an area around the source of the verbal command. The user may speak "turn on the game" while a song plays in the background. The source of the song may be another device on the network, which can be used to help determine a location of the origin of the command (e.g., the background audio includes a song, so the microphone should be next to the speaker that is providing the song, etc.). The audio of the song may be included with the audio segment from user 420.

The closest device may be chosen. For example, the closest device may be the device with the background audio signal within a threshold value of the user's background audio signals (e.g., by comparing the acoustic fingerprint of each background audio signal, etc.). This may signify that the user 420 and the device 412 are in the same room.

Figure 6:
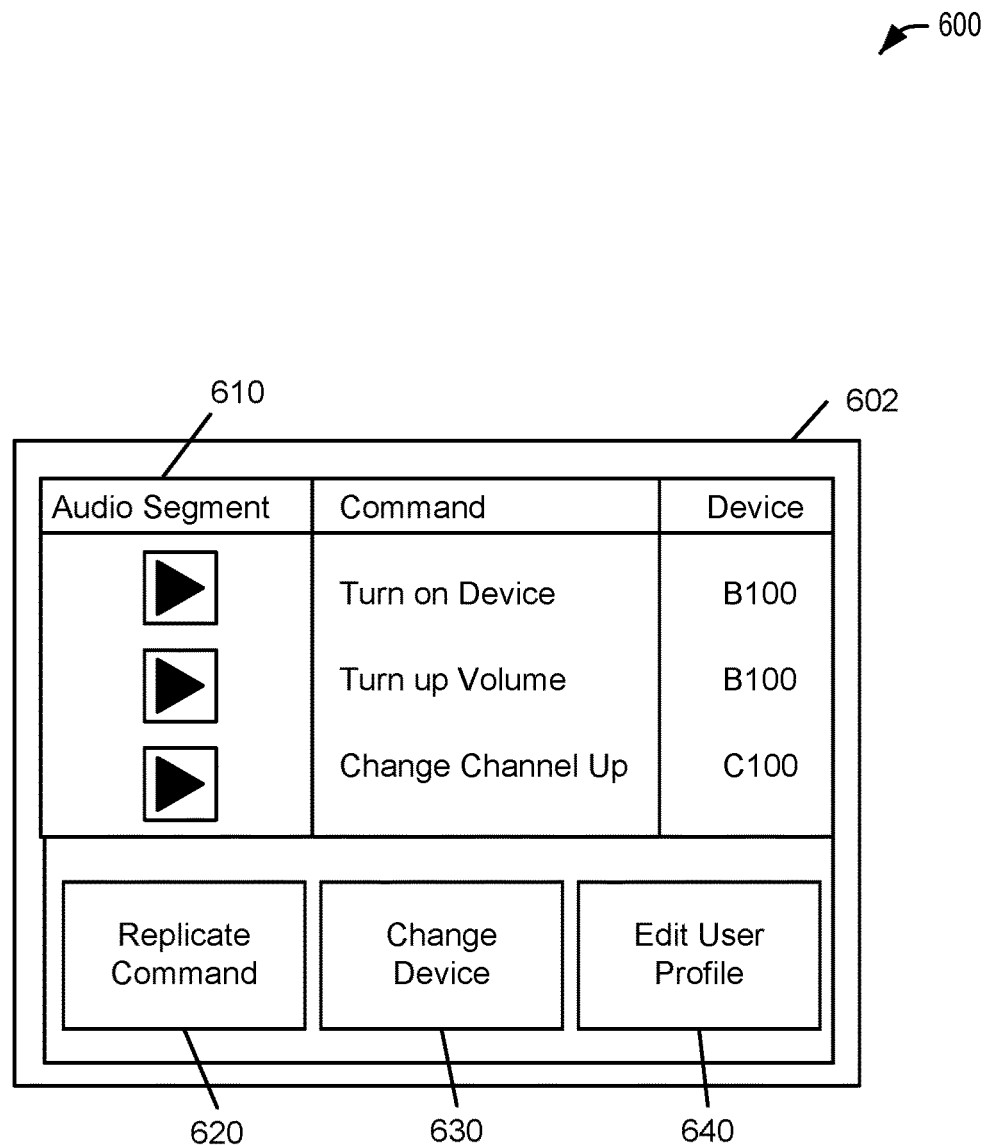
FIG. 6 illustrates an example user interface for curating audio and IR commands through machine learning described herein, according to at least one example.

In some examples, the closest device may be chosen by comparing known locations of devices and a user. For example, the computer system 402 may receive a list of devices that are in a particular room, for one or more rooms in a home network, where the devices in the same room may be proximate device of each other. This may be received from a user device using a user interface as illustrated in FIG. 6. The location of the user may be identified by a broadcast location transmitted by a user device that the user is operating (e.g., smart phone, wearable technology, etc.). The locations of the devices in the home and the user device may be compared to identify the closest device to the user.

In another example, the closest device may be determined by positioning devices (e.g., local or global positioning system (GPS), etc.). The coordinates of the devices may be used to identify which devices are within a threshold distance of each other (e.g., within 5 feet of each other, including a microphone and a television, or a microphone and an amplifier, etc.), where the devices within the threshold distance of each other are proximate devices. In some examples, the coordinates may be used to help identify a location of a user and devices that are close to a user (e.g., when the user provides a command, etc.).

In some examples, locations of one or more devices may be identified in part by implementing a microphone array. In some examples, the microphone array may include any number of microphones that can receive audio from an audio source and provide the audio to the computer system 402. The computer system 402 can record and/or analyze the received audio from the microphone array, at least in part by correlating the location of the microphone in the microphone array with the location of the audio source. In some examples, the locations of the one or more microphones in the microphone array may be fixed by a physical relationship in space between the different individual microphones. The audio may correspond with direction information as well (e.g., decreasing audio level as audio source moves away from the microphone, gesture detection, etc.).

In some examples, the location of other devices may be identified by a user device. For example, the user may operate a user device that emits a wireless signal and receives one or more wireless signals, such that the user device can determine which wireless signals that are stronger or weaker based on the signal strength of the received signal. The stronger wireless signals may be closer to the user device and the weaker wireless signals may be farther away from the user device. These signal strengths may be shared between devices and/or devices and the devices can collectively determine their proximity to each other based on the relative signal strength to other devices (e.g., two devices with stronger signals from device A, but one device has a stronger signal strength to device B than to device C, relating to the relative location of that device being closer to device B than to device C, etc.).

In some examples, the location of other devices may be identified by these other devices (e.g., as a constant location detection, a location detection without a previously received command, etc.). For example, the devices may broadcast one or more wireless signals that are received by other devices in the network. The wireless signals may be transmitted and received between these devices. In some examples, the devices may determine the location of itself based in part on the relative location of the device to other devices (e.g., within 5 feet of device A and device B, etc.).

In some examples, the computer system 402 can request location information from the devices in the network irrespective of receiving a particular audio segment. The computer system 402 may identify the locations of the devices periodically and/or in response to receiving the particular audio segment.

In some examples, a location may be determined by gesture detection. The gesture detection may be performed using a gesture recognition device. For example, an example gesture recognition device is described in "Bringing Gesture Recognition to All Devices" by Kellogg et al., which is herein incorporated by reference for all purposes. The gestures and additional information identified from the gesture recognition device can be used to determine proximity information.

The computer system 402 may choose a device based on historical interactions, temporal patterns or usage patterns, or user preferences. For example, the user 420 may provide the particular audio segment to watch a football game every Monday (e.g., "let's watch some football!").

The computer system 402 may determine which devices are active. In some examples, the computer system 402 may receive a list of currently active devices. The currently active devices may be active by being powered on and communicatively connected with the network. The computer system 402 may connect with active devices through wired or wireless methods (e.g., infrared radiation (IR) signals, wired or wireless messaging, etc.). The list of currently active devices may be stored with a data store.

The list of active devices may be identified by receiving an IR signal associated with the device through an IR broadcast. As a sample illustration, television model A100 may be active in a network. This may include where the television is plugged into a wall and discoverable by the computer system 402, because both the television and the computer system 402 are on the same network. To turn on this model television, a remote device that is provided for that television transmits IR signal "0220E0040" (e.g., in hexadecimal code, etc.). When the television receives "0220E0040," the television may decode the IR signal to determine a corresponding command, which would be to turn on the television. In response, the television may provide power to a display screen to provide an image on the screen. Similarly, IR signal "EE000810E3" may turn up the volume of the television, such that when the IR receiver receives this IR signal, the television volume can turn up on response to the received IR signal.

The computer system 402 may choose a device based on receiving a response to a provided confirmation. For example, the confirmation can confirm that the user would like to associate the audio segment with the command. The computer system 402 can replay the audio segment and the command as confirmation. For example, the confirmation may follow the format: "would you like to associate <sound> with <command> for <device>?" As a sample illustration, the computer system 402 may provide (e.g., using a speaker associated with the computer system 402 and/or on the network, etc.): "would you like 'zip' to fast-forward the cable box in the living room?" In another example, the user 420 may interact with a user interface to identify a device to correspond with the command, as illustrated in FIG. 6.

The computer system 402 may choose a device that is not discoverable on a network, and may mimic or replicate a signal that the device recognizes. In some examples, the origin of the IR signal may be identified but may not be connected to a network with the computer system 402 (e.g., an air conditioning (AC) unit, baby monitor, lights, etc.).

Figure 5:
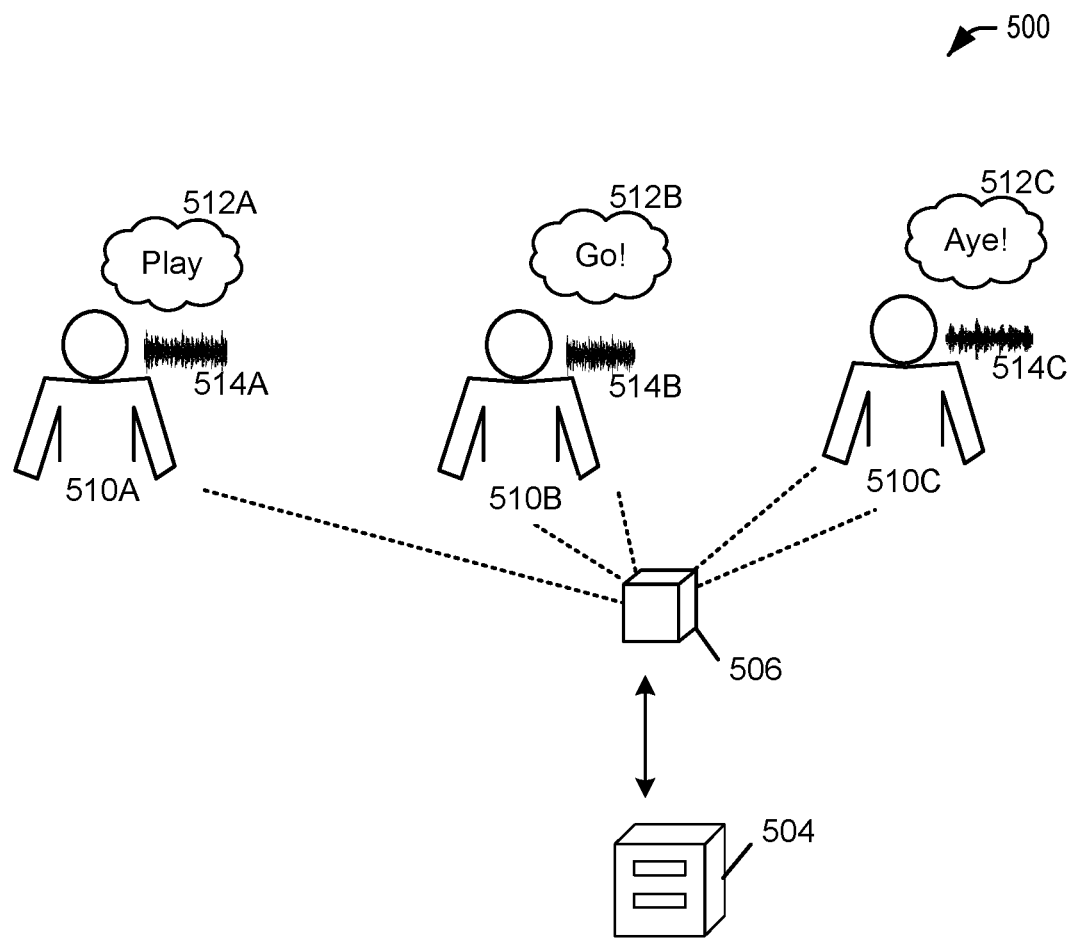
FIG. 5 illustrates an example for curating audio and IR commands through machine learning described herein, according to at least one example.

FIG. 5 illustrates an example for curating audio and IR commands through machine learning described herein, according to at least one example. For example, a computer system 504 may communicate with a data store 506 to identify and store one or more user profiles. Each user profile may correspond with a user 510, one or more words 512 used in an audio segment, and one or more audio segments 514 or commands. The computer system 504 and data store 506 may be similar to the one or more curating devices 210 and/or one or more server computers 212, and the one or more data stores 234 in FIG. 2.

The computer system 504 may generate a user profile after a threshold number of repetitions of receiving acoustic fingerprints from the user. As such, a guest or visitor profile may not be generated for a new voice (e.g., where the acoustic fingerprint of the audio is dissimilar by a threshold value to the stored acoustic fingerprints, etc.), but may be generated over time (e.g., by receiving the voice as an acoustic fingerprint more than a threshold number of times, 2-5 times, etc.). A plurality of audio streams that include the new voice may correspond with the user. In some examples, when the new voice has provided audio segments and corresponding commands that exceed the threshold, the user interface (as illustrated in FIG. 6) may provide the user profile and the ability to alter and/or remove it.

The computer system 504 may generate a personal vocabulary or dictionary for the user. The dictionary may comprise an audio segment (e.g., using words, sounds, non-English terms, etc.) that may correspond with the desired command. For example, a bell for a particular user may correspond with a "play" command (e.g., when the user is non-verbal, etc.).

The computer system 504 may generate a priority of user profiles. For example, the user profile may correlate a received audio segment with a particular user, including an acoustic fingerprint of the audio signal that uniquely identifies the user's voice. The user profile may correspond with a priority (e.g., a command from user A is higher priority than a command from user B, etc.). The priority may be adjusted via a user interface, as illustrated in FIG. 6.

The computer system 504 may generate a priority of commands. As a sample illustration, an audio segment and/or command to operate a first device (e.g., television, etc.) may be higher priority than an audio segment and/or command to operate a second device (e.g., baby monitor, etc.).

FIG. 6 illustrates an example user interface for curating audio and IR commands through machine learning described herein, according to at least one example. The illustration 600 may comprise a user interface 602 for interacting with the audio stream, one or more audio segments, commands, user profiles, devices, the computer system, and the like.

The user interface 602 may provide a tool to replay an audio segment 610, to identify the command, or to select a device that corresponds with the audio segment or command. The audio segment 610, in some examples, may be an average of audio segments (e.g., generated by the one or more curating devices 210 and/or one or more server computers 212, etc.). In some examples, the user interface 602 may display text that has been converted from the received audio segments (e.g., "play" "zip zip," etc.). As illustrated, a first audio segment may correspond with turning on a device labeled B100, a second audio segment may correspond with turning up a volume of the same device labeled B100, and a third audio segment may correspond with changing a channel up for a device labeled C100.

The user interface 602 may provide a list of commands and/or audio segments for a specific user. The user may access commands and/or audio segments by registering and/or logging in to the user interface 602 using credentials provided to the user device, the one or more curating devices 210, and/or one or more server computers 212.

The user interface 602 may also provide functionality to replicate a rule. The replication tool 620 may provide the functionality to repeat an audio segment and/or command for another device or user profile. The change device tool 630 may provide the functionality to change a device for a particular audio segment or command, or change a user profile for the audio segment or command. The edit profile tool 640 may provide the functionality to change a device name, user name, location of a device, and the like.

The user interface 602 may provide the functionality to remove commands. For example, the audio segment and/or command may be added to a user profile and then removed (e.g., using the user interface 602). As a sample illustration, the term "stop" may correspond with stopping a movie on a television in a living room. When two people are playing and someone yells "stop," the computer system may stop the movie and frustrate the movie watchers. By operating the user interface 602, the user may add a requirement to say a key word prior to the command (e.g., "begin" and then the audio segment "stop," etc.) or to be able to turn off the audio segment/command pairing for a period of time.

Figure 7:
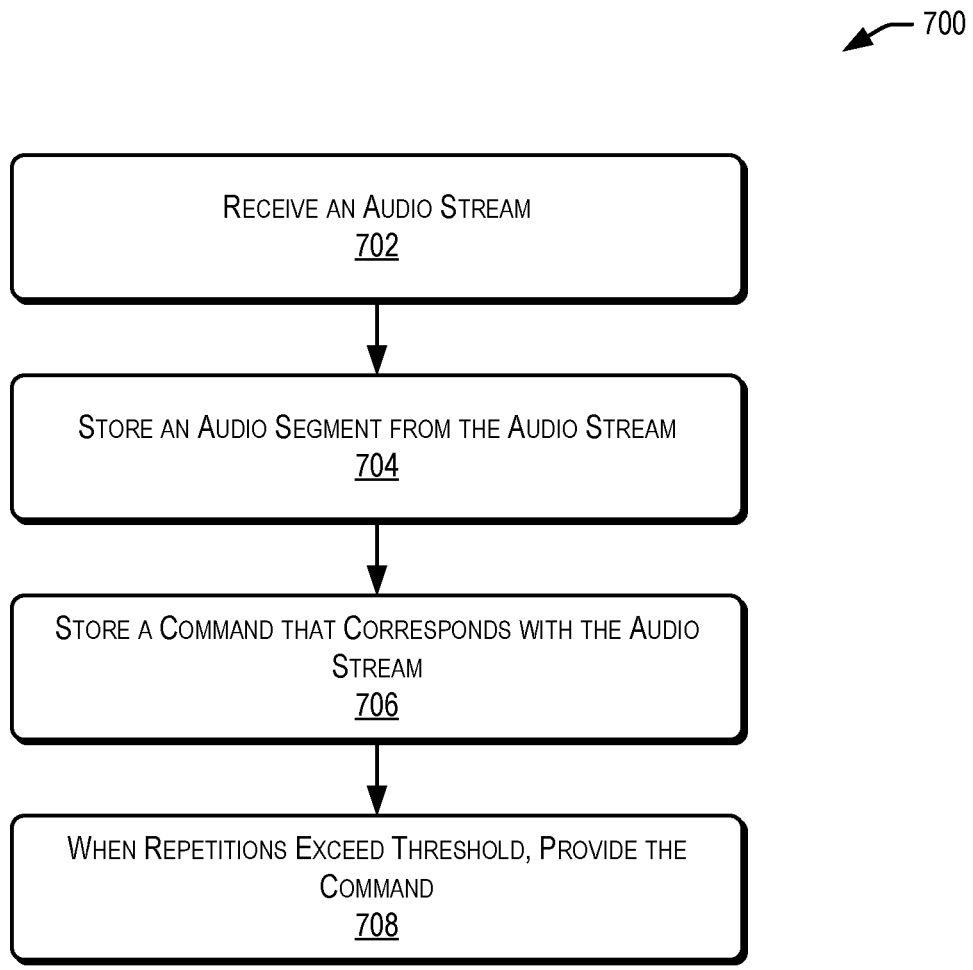
FIG. 7 illustrates an example flow of curating audio and IR commands through machine learning described herein, according to at least one example.

FIG. 7 illustrates an example flow of curating audio and IR commands through machine learning described herein, according to at least one example. In some examples, the one or more curating devices 210 and/or one or more server computers 212 (e.g., utilizing at least one of the audio module 236, the command module 238, the user profile module 240, the infrared radiation (IR) module 242, the location identifier module 244, and/or the active device module 246) or one or more user devices 204 shown in FIG. 2 may perform the process 700 of FIG. 7.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at 702 by receiving an audio stream. For example, the one or more curating devices 210 may receive an audio stream that includes a plurality of audio segments. The audio stream may be stored in a first data store. At 704, an audio segment of the plurality of audio segments may be stored in a second data store. For example, the one or more curating devices 210 may store the audio segment in the second data store. At 706, the one or more curating devices 210 may also store a command in the second data store. In some examples, the command may correspond with the audio segment. The one or more curating devices 210 may determine that a number of repetitions of the audio segment exceeds a threshold at a first time and, at 708, when the audio segment is received at a second time, the one or more curating devices 210 may provide the command that corresponds with the audio segment to an output device to cause an operation of the output device.

Figure 8:
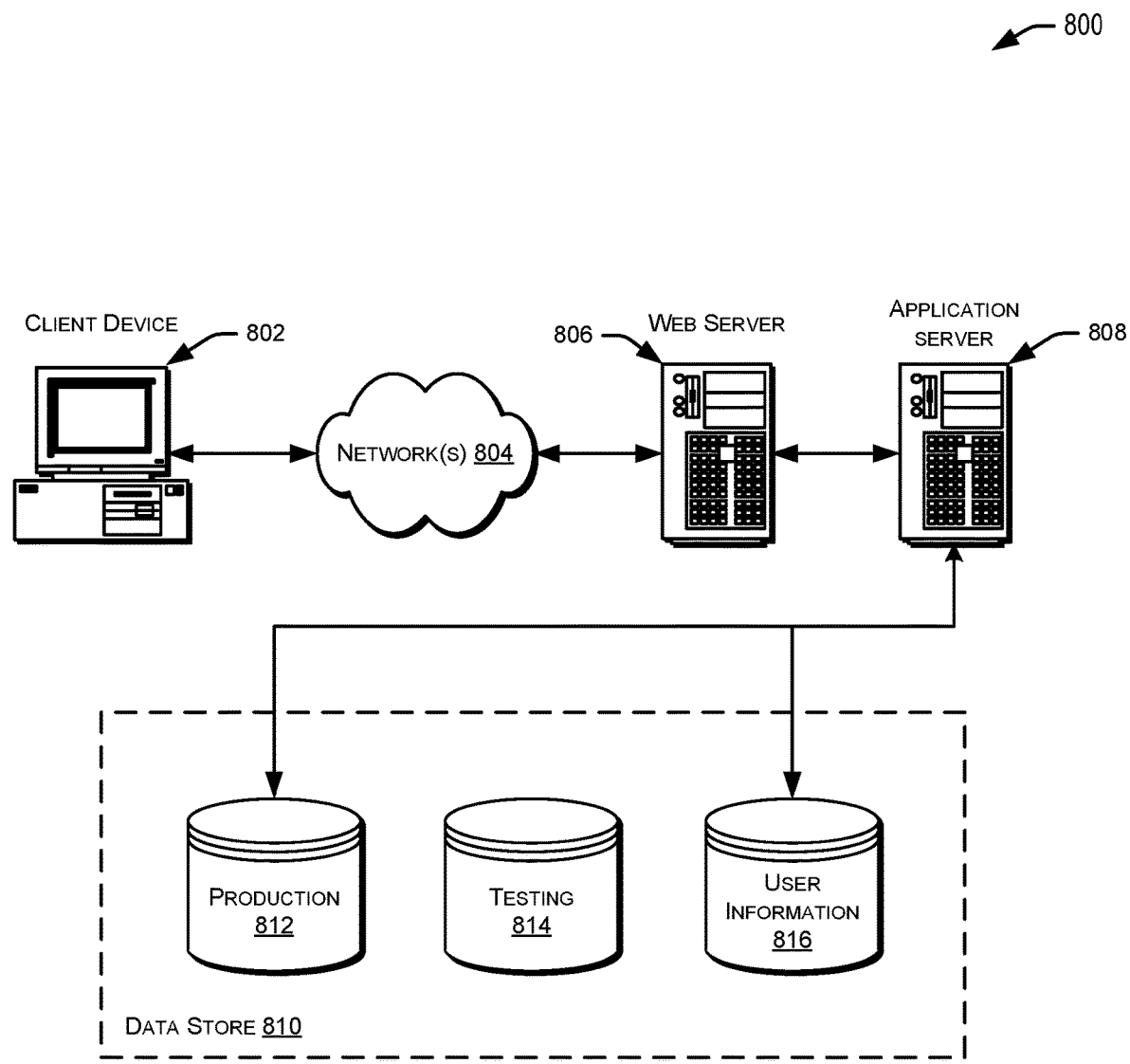
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers.

The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving an audio stream that includes a plurality of audio segments, the audio stream corresponding to an acoustic fingerprint associated with a user profile;
   obtaining, from the user profile, data indicative of a command received by an output device associated with the user profile;
   determining, from the user profile associated with the acoustic fingerprint, that an audio segment in the audio stream is associated in time with the command;
   when a number of repetitions of an association in time of the audio segment and command exceeds a threshold, updating the user profile with the association between the audio segment and the command; and
   in response to a subsequent receipt of the audio segment, providing the command that corresponds with the audio segment to the output device to cause an operation of the output device, the command provided based at least in part on the association between the audio segment and the command.

2. The computer-implemented method of claim 1, further comprising:
   when the number of repetitions exceeds the threshold, providing confirmation to correlate the command with the audio segment.

3. The computer-implemented method of claim 1, further comprising:
   receiving the command from an infrared radiation (IR) signal of a controller device.

4. The computer-implemented method of claim 1, wherein the command is device agnostic and the method further comprises:
   determining an active device; and
   transmitting the command to the active device.

5. A computer-implemented method, comprising:
   receiving, by a computer system, an audio stream that includes a plurality of audio segments, the audio stream corresponding to an acoustic fingerprint associated with a user profile;
   obtaining, from the user profile, data indicative of a command received by an output device associated with the user profile;
   determining, from the user profile associated with the acoustic fingerprint, that an audio segment in the audio stream is associated in time with the command;
   when a number of repetitions of an association in time of the audio segment and command exceeds a threshold, updating the user profile with the association between the audio segment and the command; and
   in response to a subsequent receipt of the audio segment, providing the command that corresponds with the audio segment to the output device to cause an operation of the output device, the command provided based at least in part on the association between the audio segment and the command.

6. The computer-implemented method of claim 5, further comprising:
   receiving, by the computer system, a key word in the audio stream followed by the audio segment, wherein the key word is pre-defined by the computer system.

7. The computer-implemented method of claim 5, further comprising:
   receiving, by the computer system, a key word in the audio stream followed by the audio segment, wherein the key word is correlated with the audio segment through a user interface.

8. The computer-implemented method of claim 5, further comprising:
   before the threshold is exceeded, flagging the audio segment.

9. The computer-implemented method of claim 5, further comprising:
   comparing the acoustic fingerprint of the audio segment with a second acoustic fingerprint of a user.

10. The computer-implemented method of claim 5, further comprising:
    determining the acoustic fingerprint of the audio segment, wherein the acoustic fingerprint of the audio segment comprises at least a tempo and an average spectrum.

11. The computer-implemented method of claim 5, further comprising:
    storing the acoustic fingerprint of a user with the user profile.

12. A computer system, comprising:
    a memory configured to store computer-executable instructions; and
    at least one processor in communication with the memory configured to execute the computer-executable instructions to at least:
    receive an audio stream that includes a plurality of audio segments, the audio stream corresponding to an acoustic fingerprint associated with a user profile;
    obtain, from the user profile, data indicative of a command received by an output device associated with the user profile;
    determine, from the user profile associated with the acoustic fingerprint, that an audio segment in the audio stream is associated in time with the command;
    when a number of repetitions of an association in time of the audio segment and command exceeds a threshold, update the user profile with the association between the audio segment and the command; and
    in response to a subsequent receipt of the audio segment, provide the command that corresponds with the audio segment to the output device to cause an operation of the output device, the command provided based at least in part on the association between the audio segment and the command.

13. The computer system of claim 12, further comprising:
    a speaker, wherein the at least one processor in communication with the memory is further configured to execute the computer-executable instructions to at least:
    provide a confirmation to correlate the command with the audio segment.

14. The computer system of claim 12, wherein the at least one processor in communication with the memory is further configured to execute the computer-executable instructions to at least:

store one or more user profiles for one or more users, wherein each of the user profiles comprises the acoustic fingerprint of the one or more users.

15. The computer system of claim 14, wherein the user profile of the user corresponds with a first priority and the one or more user profiles individually correspond with a different priority.

16. The computer system of claim 12, wherein the at least one processor in communication with the memory is further configured to execute the computer-executable instructions to at least:

provide a user interface associated with the audio segment and the command.

17. The computer system of claim 16, wherein the user interface enables replay of the audio segment, and wherein the replay comprises an average of audio segments that corresponds with the command.

18. The computer system of claim 16, wherein the user interface enables selecting a different output device for the audio segment.

19. The computer system of claim 12, wherein a location of the output device is associated with a physical location of the output device determined from a global or local positioning system.

20. The computer system of claim 12, wherein the output device is determined based on a proximity of the output device to a location of a user device worn or operated by a user.

* * * * *